United States Patent
Han et al.

(10) Patent No.: US 10,981,555 B2
(45) Date of Patent: Apr. 20, 2021

(54) VEHICLE EQUIPPED WITH ELECTRIC MOTOR AND PARKING CONTROL METHOD THEREFOR

(71) Applicants: HYUNDAI MOTOR COMPANY, Seoul (KR); KIA MOTORS CORPORATION, Seoul (KR)

(72) Inventors: Soo Lim Han, Hwaseong-si (KR); Han Seung Myoung, Chungcheongnam-do (KR); Ja Chun Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 273 days.

(21) Appl. No.: 16/206,902

(22) Filed: Nov. 30, 2018

(65) Prior Publication Data

US 2020/0047736 A1    Feb. 13, 2020

(30) Foreign Application Priority Data

Aug. 7, 2018  (KR) .................. 10-2018-0091760

(51) Int. Cl.
*B60W 10/18*       (2012.01)
*B60W 10/08*       (2006.01)
*B60W 30/18*       (2012.01)

(52) U.S. Cl.
CPC .......... *B60W 10/182* (2013.01); *B60W 10/08* (2013.01); *B60W 30/181* (2013.01);
(Continued)

(58) Field of Classification Search
CPC .. B60W 10/182; B60W 10/08; B60W 30/181; B60W 2552/15; B60W 2510/083;
(Continued)

(56) References Cited

U.S. PATENT DOCUMENTS 5,471,384 A * 11/1995 Nakashima .............. B60K 1/00
                                                          180/65.1
5,757,153 A *  5/1998 Ito ....................... B60L 15/2054
                                                          318/370
(Continued)

FOREIGN PATENT DOCUMENTS

CN        111775713 A  * 10/2020
GB         2551528 A  * 12/2017  ............ B60W 10/10
(Continued)

OTHER PUBLICATIONS

Eui-Chun et al., "Effects of Rotor Pole Angle on Torque Characteristics of a Limited-Angle Torque Motor," 2017, Publisher: IEEE.*
(Continued)

*Primary Examiner* — Tuan C To
(74) *Attorney, Agent, or Firm* — Morgan, Lewis & Bockius LLP (57) ABSTRACT

Disclosed are a vehicle equipped with an electric motor, which is capable of preventing damage to a mechanical axle-fixing device when a parking range is selected under a specific condition, and a parking control method therefore. The parking control method includes calculating output torque of the electric motor to stop the vehicle when a parking (P) range is selected in the situation in which a specific condition is satisfied, controlling the electric motor in response to the output torque, and activating a driving shaft fixing unit when the vehicle is stopped by the controlling.

18 Claims, 5 Drawing Sheets

(52) U.S. Cl.
CPC ............... *B60W 2510/083* (2013.01); *B60W 2510/1005* (2013.01); *B60W 2540/10* (2013.01); *B60W 2540/12* (2013.01); *B60W 2552/15* (2020.02); *B60W 2710/083* (2013.01)

(58) Field of Classification Search
CPC ..... B60W 2510/1005; B60W 2540/10; B60W 2540/12; B60W 2710/083; B60W 30/06
USPC .......................................................... 701/70
See application file for complete search history.

(56) References Cited

U.S. PATENT DOCUMENTS

| | | | | |
|---|---|---|---|---|
| 6,463,821 | B1* | 10/2002 | Reed, Jr. ............... | F16D 27/112 74/330 |
| 8,924,105 | B1* | 12/2014 | Miesterfeld ........... | F16H 63/486 701/53 |
| 2001/0049570 | A1* | 12/2001 | Yamaguchi ........... | B60W 10/06 701/22 |
| 2007/0173372 | A1* | 7/2007 | Ueno ............. | B60W 30/18072 477/3 |
| 2012/0136543 | A1* | 5/2012 | Jang ................... | F16H 61/0059 701/53 |
| 2013/0020156 | A1* | 1/2013 | Jang ..................... | B60T 11/046 188/170 |
| 2013/0325231 | A1* | 12/2013 | Park ........................ | F16D 48/06 701/22 |
| 2016/0001774 | A1* | 1/2016 | Nakada ................ | B60W 30/06 701/22 |
| 2016/0244035 | A1* | 8/2016 | Yasui .................... | B60T 13/741 |
| 2017/0166174 | A1* | 6/2017 | Narahara ................ | B60T 8/241 |
| 2017/0297560 | A1* | 10/2017 | Ko ........................ | B60W 10/08 |
| 2018/0118197 | A1* | 5/2018 | Kim ....................... | B60W 30/06 |
| 2020/0317040 | A1* | 10/2020 | Ogino ................... | B60K 6/387 |

FOREIGN PATENT DOCUMENTS

| | | | | |
|---|---|---|---|---|
| JP | 2013113434 | A | * 6/2013 | |
| JP | 2018085878 | A | * 5/2018 | |
| WO | WO-2016121256 | A1 | * 8/2016 | ............ F16D 48/06 |
| WO | WO-2017090479 | A1 | * 6/2017 | ............ F16H 59/08 |

OTHER PUBLICATIONS

Lin et al., "Localization in the Parking Lot by Parked-Vehicle Assistance," 2016, vol. 17, Publisher: IEEE.*

* cited by examiner

VEHICLE EQUIPPED WITH ELECTRIC MOTOR AND PARKING CONTROL METHOD THEREFOR

This application claims the benefit of Korean Patent Application No. 10-2018-0091760, filed on Aug. 7, 2018 in the Korean Intellectual Property Office, which is hereby incorporated by reference as if fully set forth herein.

TECHNICAL FIELD

The present disclosure relates to a vehicle equipped with an electric motor and a parking control method therefor, and more particularly, to a vehicle equipped with an electric motor, which is capable of preventing damage to a mechanical axle-fixing device when a parking range is selected under a specific condition, and a parking control method therefor.

BACKGROUND

Driving is one of the most important factors using vehicles. However, a parking process is no less important than driving in the operation of vehicles because driving generally ends with parking. Various devices are used for a parking process.

For example, a parking range (i.e., a P-range) of a transmission is used to keep a vehicle from moving from the location where the vehicle is parked. This will now be described with reference to FIG. 1.

Figure 1:
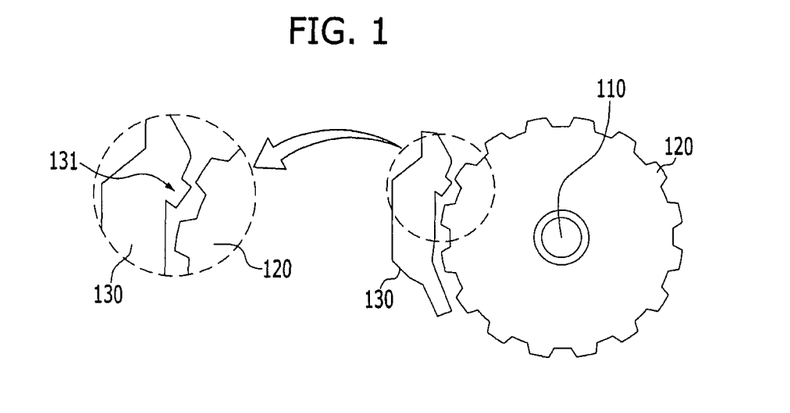
FIG. 1 is a view showing the operation principle of a P-range of a general transmission.

FIG. 1 is a view showing the operation principle of a P-range of a general transmission.

Referring to FIG. 1, in the P-range of the transmission, an insertion end 131 of a parking sprag 130 is engaged with a parking gear 120, which is fixedly engaged with the output end of the transmission or to a rotary shaft 110 of a final reduction device, and thus the rotary shaft 110 is mechanically fixed, whereby preventing movement of the vehicle. However, when a large load is applied to the rotary shaft 110, the insertion end 131 of the parking sprag 130 is likely to be damaged, and may be gradually worn to thereby lose its function due to cumulative use.

Recently, with the continued demand for improvement of fuel efficiency of vehicles and stringent regulations on emissions from vehicles in many countries, the demand for environmentally friendly vehicles has increased. As practical representatives thereof, hybrid electric vehicles (HEVs), plug-in hybrid electric vehicles (PHEVs) and electric vehicles (EVs) have been developed.

HEVs, PHEVs and EVs are all equipped with electric motors. In the parking process thereof, creep torque control is applied to the electric motor in order to simulate the low-speed characteristics of a vehicle equipped with an internal combustion engine and an automatic transmission (A/T). Here, the creep torque is a torque that is transmitted to a driving shaft via a torque converter by the idle torque of an engine even when an accelerator pedal is not pressed in an internal combustion engine vehicle equipped with an automatic transmission, and the creep phenomenon is a phenomenon in which the vehicle travels slowly using the creep torque. When the creep phenomenon occurs, the vehicle usually travels at 10 kph or lower. In the case of an environmentally friendly vehicle, it is common to travel using only an electric motor with an engine off for fuel efficiency in a low-speed situation. In this manner, the creep phenomenon is simulated using the electric motor.

Figure 2:
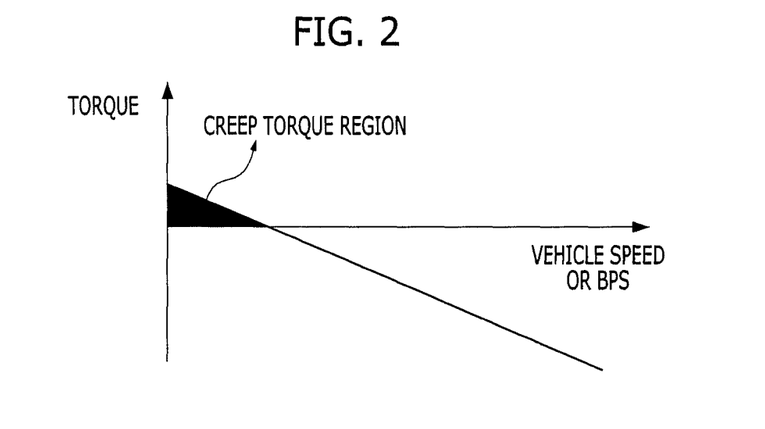
FIG. 2 is a view showing an example of creep torque control of a vehicle equipped with a general electric motor.

FIG. 2 is a view showing an example of creep torque control of a vehicle equipped with a general electric motor.

Referring to FIG. 2, in the situation in which an accelerator pedal is not manipulated, an electric motor of an environmentally friendly vehicle operates in a positive torque mode until the vehicle speed reaches a certain level, and operates in a negative torque mode after the vehicle speed exceeds the certain level in order to simulate rolling resistance. In the graph of FIG. 2, the region in which the electric motor operates in a positive torque mode is a creep torque region in which the creep torque is simulated. The horizontal axis of the graph may represent either a vehicle speed or a value of a brake pedal sensor (BPS).

However, in the case in which electronic control, such as a shift-by-wire (SBW) method, is applied for transmission control, when the shift range is switched to the P-range at a certain vehicle speed (e.g. 2.5 kph) or lower, a parking sprag is immediately engaged with a parking gear. In this case, if the vehicle is not in a completely stopped state, a load may be applied to the parking sprag due to an inclination, the inertia of the vehicle, the creep torque of the electric motor, or the like, which may cause damage to the parking sprag. Even if the parking sprag is not damaged, a vibration and shock may be generated in the vehicle, which may cause discomfort and anxiety to the driver.

SUMMARY

Accordingly, the present disclosure is directed to a vehicle equipped with an electric motor and a parking control method therefor that substantially obviate one or more problems due to limitations and disadvantages of the related art.

An object of the present disclosure is to provide a vehicle equipped with an electric motor, which is capable of preventing damage to a vehicle and driver's discomfort attributable to P-range selection in the state in which the vehicle is not completely stopped when parked, and a parking control method therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a parking control method for a vehicle equipped with an electric motor includes calculating output torque of the electric motor to stop the vehicle when a parking (P) range is selected in a situation in which a specific condition is satisfied, controlling the electric motor in response to the output torque, and activating a driving shaft fixing unit when the vehicle is stopped by the controlling.

In another aspect of the present disclosure, a vehicle includes an electric motor configured to provide driving force, a gear shift stage input unit configured to receive a gear shift stage input from a driver, a sensor configured to sense a moving state of the vehicle, a motor torque calculation controller configured to calculate output torque of the electric motor to stop the vehicle based on at least a portion of information obtained through the sensor when a parking (P) range is selected through the gear shift stage input unit in a situation in which a specific condition is satisfied and to control the electric motor in response to the output torque, and a driving shaft fixing unit configured to be activated when the vehicle is stopped under the control of the motor torque calculation controller.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, an illustration of elements having no connection with the description is omitted, and the same or extremely similar elements are designated by the same reference numerals throughout the specification.

Throughout the specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

In a vehicle equipped with an electric motor according to an embodiment of the present disclosure, when the driver selects the P-range under a predetermined condition, the vehicle is stopped through torque control of the electric motor before a driving shaft is mechanically fixed.

The structure of a vehicle to which embodiments of the present disclosure may be applied and the concept of motor torque control according to an embodiment will be described with reference to FIGS. 3 and 4.

Figure 3:
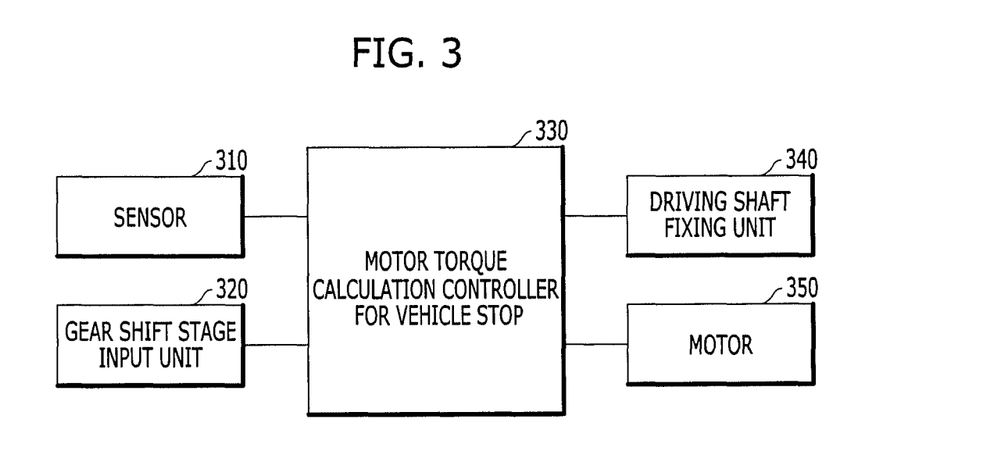
FIG. 3 is a block diagram showing an example of the structure of a vehicle to which embodiments of the present disclosure are applicable.
Figure 4:
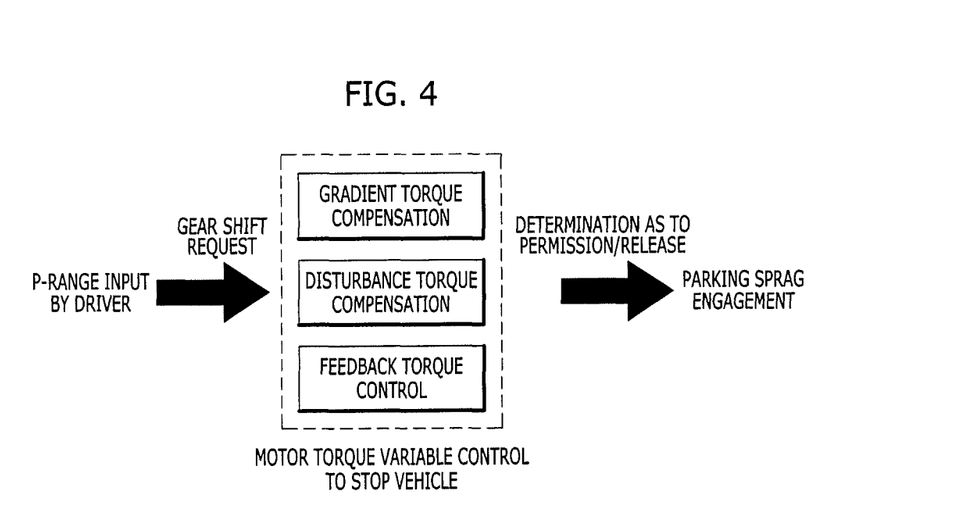
FIG. 4 is a view showing the concept of performing motor torque control to stop a vehicle and subsequently fixing a driving shaft according to an embodiment of the present disclosure.

FIG. 3 is a block diagram showing an example of the structure of a vehicle to which embodiments of the present disclosure may be applied, and FIG. 4 is a view showing the concept of performing motor torque control to stop the vehicle and subsequently fixing the driving shaft according to an embodiment of the present disclosure.

Referring to FIGS. 3 and 4, the vehicle to which embodiments of the present disclosure may be applied may include a sensor 310, a gear shift stage input unit 320, a motor torque calculation controller for vehicle stop 330, a driving shaft fixing unit 340, and a motor 350. This configuration is representative and provided merely for the purpose of describing exemplary embodiments of the present disclosure. Needless to say, more or fewer components than the above components may be included in an actual vehicle. Hereinafter, the respective components will be described.

The sensor 310 may sense the inclination of the road, the (longitudinal) acceleration of the vehicle, the vehicle speed, and the like. To this end, the sensor 310 may include an acceleration sensor, a vehicle speed sensor, and the like, without being limited thereto.

The gear shift stage input unit 320 is not limited to a specific form, as long as the driver can select the P-range. For example, the gear shift stage input unit 320 may include at least one of a shift lever, a shift button, a shift dial, or a shift paddle.

The motor torque calculation controller for vehicle stop 330 determines whether a specific condition is satisfied based on a sensing value obtained by the sensor 310. When the P-range is selected (i.e., request for a shift) through the gear shift stage input unit 320 in the state in which the specific condition is satisfied, the motor torque calculation controller for vehicle stop 330 may variably control the torque of the motor 350 to stop the vehicle. Upon determining that the vehicle has been stopped, the motor torque calculation controller for vehicle stop 330 may activate the driving shaft fixing unit 340.

Here, the specific condition may be a state in which the accelerator pedal and the brake pedal are not manipulated (i.e., APS & BPS=0, a coasting travel or creep torque simulation situation) and the vehicle speed is not 0 (i.e. the vehicle is not in the stopped state) but is a predetermined level (e.g., 2.5 kph) or lower.

The torque control of the motor 350 to stop the vehicle may include gradient torque compensation depending on the current inclination of the road, disturbance torque compensation depending on the actual deceleration relative to the motor torque command, and feedback torque compensation depending on the relationship between the vehicle speed and the motor RPM. Of course, the torque control of the motor 350 includes base torque calculation, which is a basic factor. The torque compensation will be described later in more detail with reference to FIGS. 5 and 6.

The driving shaft fixing unit 340 may be implemented as the above-described parking sprag.

The motor 350 may be an electric motor that transmits driving force to the driving shaft.

In the configuration of the vehicle described above, each of the driving shaft fixing unit 340 and the motor 350 may further include a controller for controlling the same. For example, the driving shaft fixing unit 340 may be controlled by a brake controller or a transmission controller, and the motor 350 may be controlled by a motor control unit (MCU). Accordingly, the motor torque calculation controller for vehicle stop 330 may transmit a control command to the brake control unit or the transmission control unit in order to activate or deactivate the driving shaft fixing unit 340, and may transmit a torque command to the motor control unit in order to control the operation state of the motor 350.

The motor torque calculation controller for vehicle stop 330 may be implemented as any one of the above-described control units or controllers. Alternatively, the motor torque calculation controller for vehicle stop 330 may be a control unit other than the above-described control units, for example, a vehicle control unit (VCU) of an electric vehicle (EV) or a hybrid control unit (HCU) of a hybrid electric vehicle (HEV). Alternatively, the motor torque calculation controller for vehicle stop 330 may be a separate controller for performing its function.

Hereinafter, the vehicle stop control process performed by the motor torque calculation controller for vehicle stop 330 will be described with reference to FIGS. 5 and 6.

Figure 5:
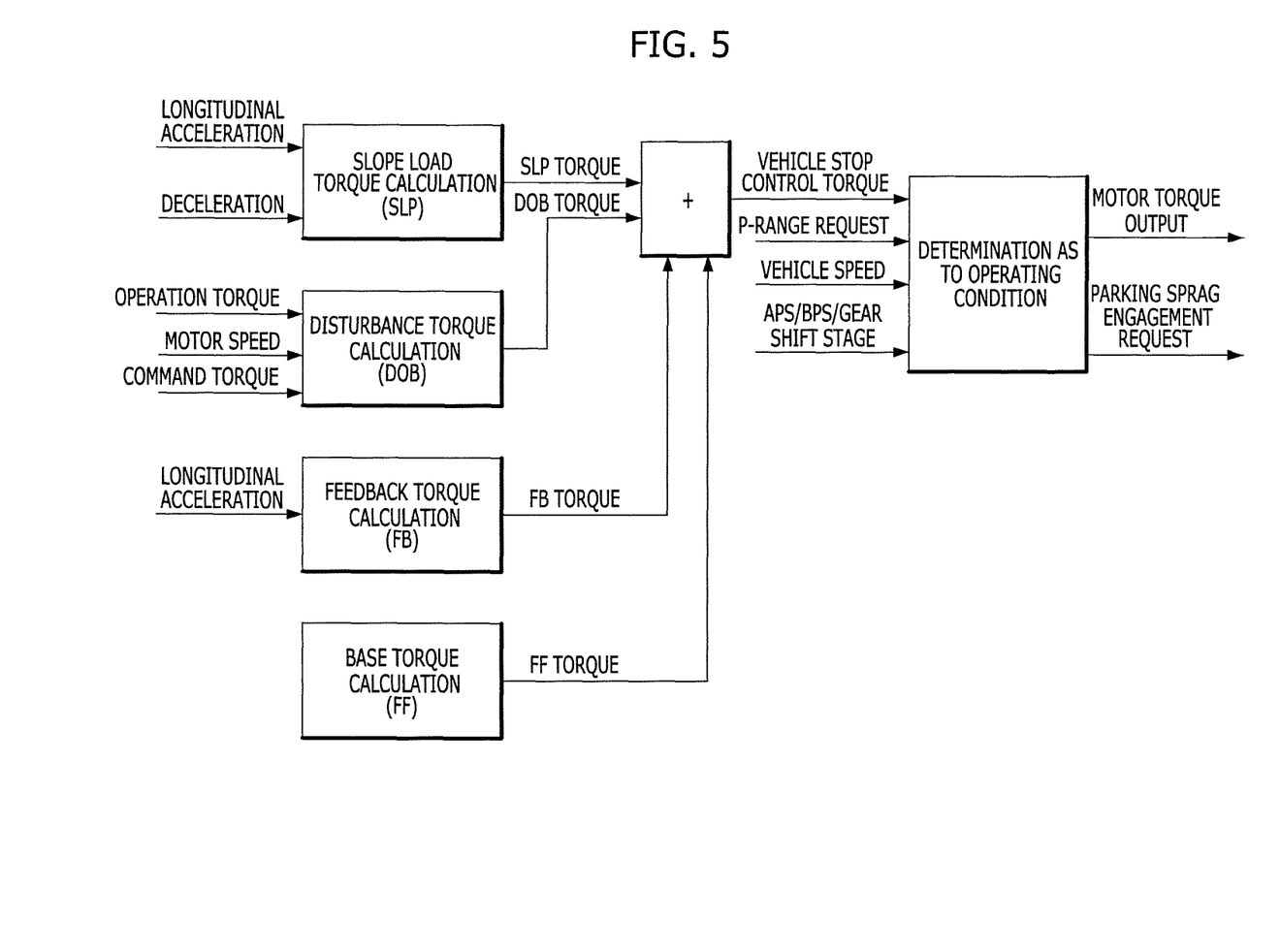
FIG. 5 is a view showing an example of the operation logic of a motor torque calculation controller according to an embodiment of the present disclosure.
Figure 6:
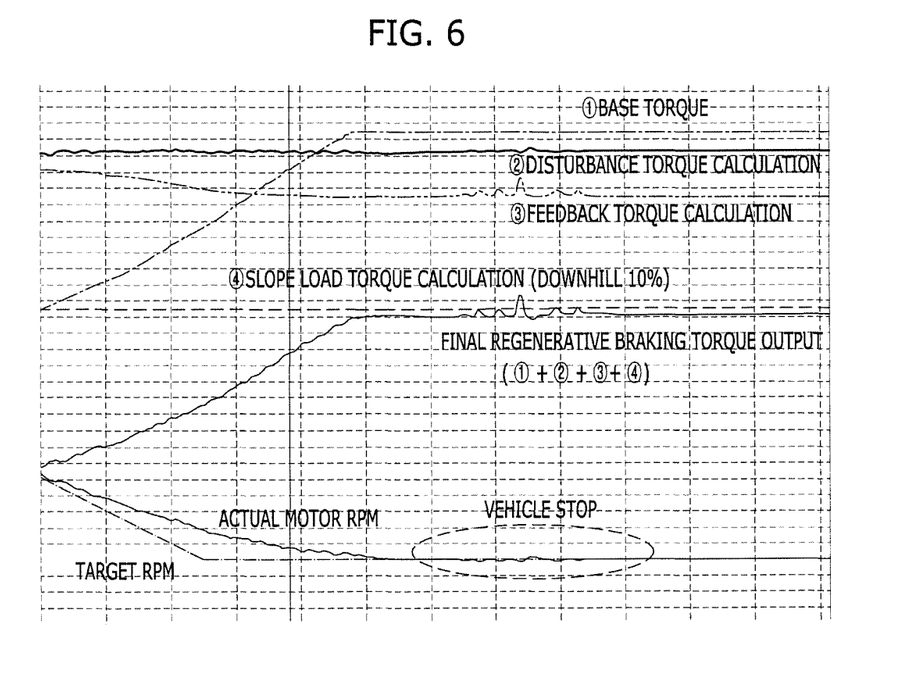
FIG. 6 is a graph showing an example of the torque control process of the motor torque calculation controller according to an embodiment of the present disclosure.

FIG. 5 is a view showing an example of the operation logic of the motor torque calculation controller according to an embodiment of the present disclosure, and FIG. 6 is a graph showing an example of the torque control process of the motor torque calculation controller according to an embodiment of the present disclosure.

Referring to FIG. 5, when there is a request to shift to the P-range in the state in which the above-described specific condition is satisfied, four torque calculation processes may be included in the torque calculation for vehicle stop control before the engagement of the parking sprag.

First, the slope (SLP) load torque calculation is torque calculation performed based on the slope load due to the inclination of the road surface. The slope load may be expressed as "F(mgsinθ)×r", where m represents the weight of the vehicle, g represents the gravitational acceleration, θ represents the inclination angle of the road surface, and r represents the dynamic radius of the tire. In order to estimate the above values, the longitudinal acceleration and deceleration of the vehicle may be used as input values.

Next, the disturbance torque calculation is torque calculation performed based on a load such as weight (e.g. an increase in the number of occupants), air resistance, road friction, or the like. For example, the disturbance torque may be obtained by subtracting the motor torque command Qu from the torque due to the inertia of the vehicle and the vehicle deceleration QG-1ω. That is, the torque may be calculated through the above torque calculation process based on the actual deceleration of the vehicle relative to the motor torque command, whereby the difference therebetween may be compensated. As a result, the difference between the expected deceleration and the actual vehicle deceleration when the motor torque is applied (i.e., "QG-1ω-Qu") may be defined as a disturbance. To this end, the motor command torque and the resultant actual operation torque output from the motor and speed of the motor may be used as input values.

Next, the feedback (FB) torque calculation is torque calculation performed based on the target RPM line setup depending on the vehicle speed. The final target RPM may be set to 0 (i.e. vehicle stop), and may be implemented by a proportional-integral (PI) control process based on the difference between the target RPM and the actual RPM. To this end, a motor speed error (i.e. the difference between the target RPM and the actual RPM) may be used as an input value.

Next, the base torque, which is also known as the feed forward (FF) torque, may be obtained from the torque output map depending on the speed.

As a result, the value finally output as the vehicle stop control torque may be the sum of the slope load torque, the disturbance torque, the feedback torque, and the base torque, which are calculated by the above-described method. For example, as shown in FIG. 6, the vehicle stop control torque acts in a direction to counteract the current movement of the vehicle, that is, in the direction opposite the rotation direction of the motor, and thus may take the form of regenerative braking torque. In addition, the vehicle stop control torque may be calculated as the sum of the above-described four torque values until the vehicle is stopped (i.e. the actual motor RPM=0).

Referring back to FIG. 5, in addition to the calculation of the vehicle stop control torque, a determination may be made as to whether the condition for performing the parking sprag engagement is completely satisfied. As a result, the vehicle stop control torque may be output through the motor until the vehicle is stopped, and the parking sprag engagement may be requested when the vehicle is stopped.

Figure 7:
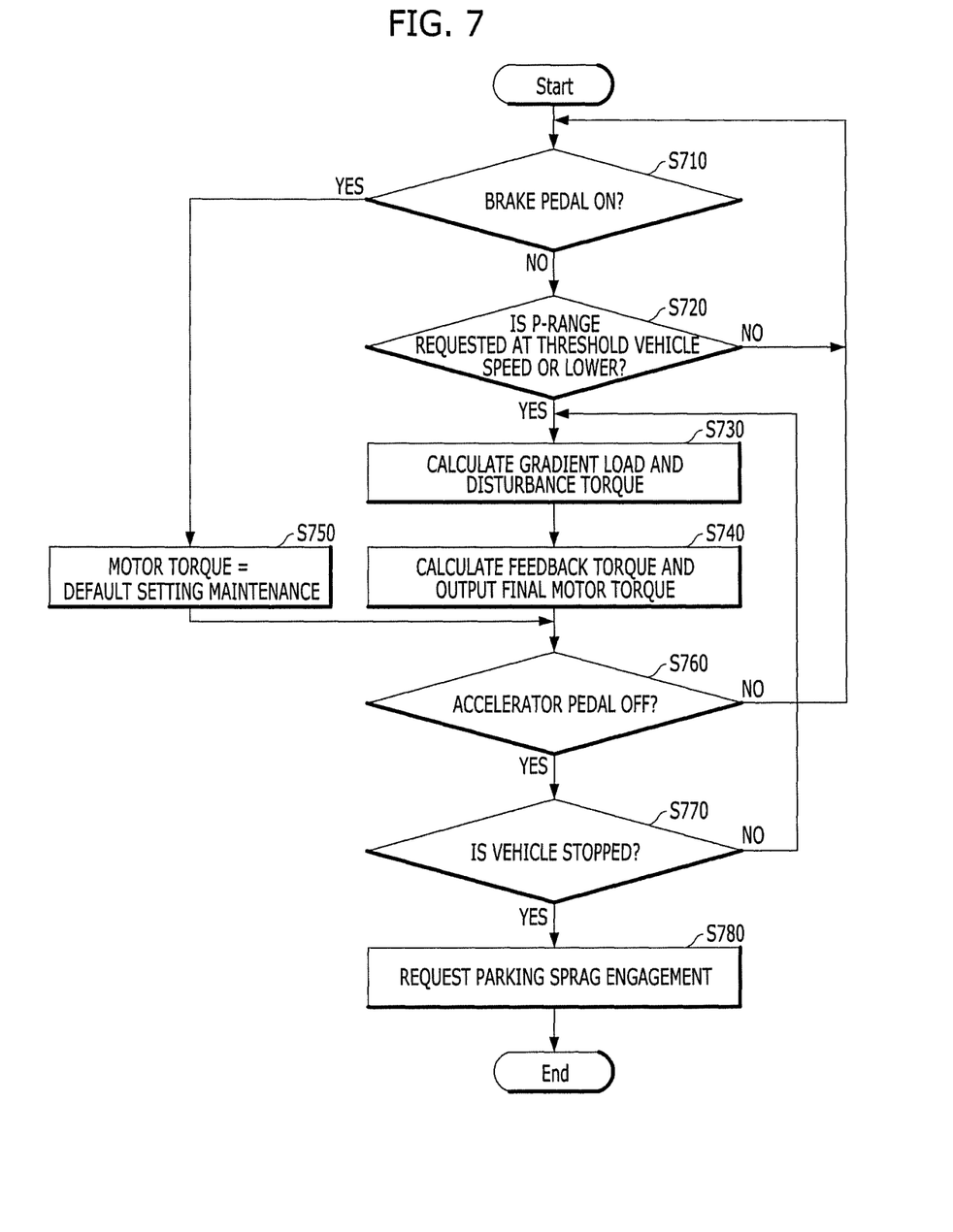
FIG. 7 is a flowchart showing an example of the parking control process according to an embodiment of the present disclosure.

The above-described process is shown in the flowchart in FIG. 7.

FIG. 7 is a flowchart showing an example of the parking control process according to an embodiment of the present disclosure.

Referring to FIG. 7, a sensor, i.e., a brake pedal sensor (BPS) may detect whether the brake pedal is manipulated (S710). When the vehicle speed is equal to or lower than a predetermined threshold speed (e.g. 2.5 kph) and there is a request to shift to the P-range in the state in which the brake pedal is not manipulated (S720), the slope load torque due to a gradient load and the disturbance torque may be calculated (S730). Further, the feedback torque may be calculated based on the motor speed error during the control, and the feedback torque may be added to the slope load torque, the disturbance torque and the base torque to calculate the final motor torque for the vehicle stop control (S740). The electric motor is controlled in response to the calculated final motor torque. Of course, when the brake pedal is manipulated (YES in S710), the motor torque may be controlled in response to the default setting instead of the torque calculation for the vehicle stop control (S750).

When the accelerator pedal is also in the off state (YES in S760) and when the vehicle is stopped in response to the motor torque for the vehicle stop control (YES in S770), the parking sprag engagement is requested (S780).

On the other hand, when the accelerator pedal is manipulated (NO in S760), it is determined that the driver does not intend to stop the vehicle. At this time, the vehicle stop control may be initialized (i.e., the final output torque calculation may be stopped), and the motor torque calculation for the vehicle stop control may be repeatedly performed until the vehicle is stopped.

The various embodiments disclosed herein, including embodiments of the motor torque calculation controller for vehicle stop 330 and/or the elements thereof, and various other controllers or control units, can be implemented using one or more processors coupled to a memory (or other non-transitory computer readable recording medium) storing computer-executable instructions and/or algorithm for causing the processor(s) to perform the operations and/or functions described above. The disclosure described above may be implemented as non-transitory, or transitory, computer-readable code in a medium in which a program is recorded. Computer-readable recording media include all kinds of recording devices in which data readable and executable by computer systems and/or processors to perform the above described operations and/or functions is stored. The computer-readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a vehicle equipped with an electric motor according to at least one embodiment of the present disclosure configured as described above is capable of preventing damage to a driving system thereof through while the vehicle is parked. As is apparent from the above description, a vehicle equipped with an electric motor according to at least one embodiment of the present disclosure configured as described above is capable of preventing damage to a vehicle and driver's discomfort attributable to P-range selection in the state in which the vehicle is not completely stopped when parked.

It will be appreciated by those skilled in the art that the effects achievable through the present disclosure are not limited to those that have been specifically described hereinabove, and other effects of the present disclosure will be more clearly understood from the above detailed description.

The above detailed description is not to be construed as limiting the present disclosure in any aspect, and is to be considered by way of example. The scope of the present disclosure should be determined by reasonable interpretation of the accompanying claims, and all equivalent modifications made without departing from the present disclosure should be included in the following claims.

What is claimed is:

1. A parking control method for a vehicle equipped with an electric motor, the method comprising:
   calculating output torque of the electric motor to stop the vehicle when a parking (P) range is selected in a situation in which a specific condition is satisfied;
   controlling the electric motor in response to the output torque; and
   activating a driving shaft fixing unit when the vehicle is stopped by the controlling,
   wherein the specific condition comprises a situation in which an accelerator pedal and a brake pedal are not manipulated at a predetermined vehicle speed or lower.

2. The parking control method according to claim 1, wherein the calculating is repeatedly performed until the vehicle is stopped.

3. The parking control method according to claim 1, wherein the calculating comprises calculating a total of slope load torque, disturbance torque, feedback torque, and base torque.

4. The parking control method according to claim 3, wherein the slope load torque is based on an inclination of a road,
   wherein the disturbance torque is based on actual deceleration of the vehicle relative to a motor torque command, and
   wherein the feedback torque is based on a difference between a target motor RPM and an actual motor RPM.

5. The parking control method according to claim 4, wherein the slope load torque is calculated using longitudinal acceleration and deceleration, and
   wherein the disturbance torque is calculated using command torque, operation torque, and a motor speed.

6. The parking control method according to claim 3, wherein the base torque is determined based on a torque output map depending on a speed.

7. The parking control method according to claim 1, wherein the driving shaft fixing unit comprises a parking gear and a parking sprag.

8. The parking control method according to claim 1, wherein the calculating is stopped when the specific condition is released.

9. A non-transitory computer-readable recording medium for recording a program that, when executed by a computer, causes the computer to perform the parking control method according to claim 1.

10. A vehicle comprising:
    an electric motor configured to provide driving force;
    a gear shift stage input unit configured to receive a gear shift stage input from a driver;
    a sensor configured to sense a moving state of the vehicle;
    a motor torque calculation controller configured to calculate output torque of the electric motor to stop the vehicle based on at least a portion of information obtained through the sensor when a parking (P) range is selected through the gear shift stage input unit in a situation in which a specific condition is satisfied and to control the electric motor in response to the output torque; and
    a driving shaft fixing unit configured to be activated when the vehicle is stopped under control of the motor torque calculation controller,
    wherein the specific condition comprises a situation in which an accelerator pedal and a brake pedal are not manipulated at a predetermined vehicle speed or lower.

11. The vehicle according to claim 10, wherein the motor torque calculation controller repeatedly calculates the output torque until the vehicle is stopped.

12. The vehicle according to claim 10, wherein the motor torque calculation controller calculates the output torque by calculating a total of slope load torque, disturbance torque, feedback torque, and base torque.

13. The vehicle according to claim 12, wherein the slope load torque is based on an inclination of a road,
    wherein the disturbance torque is based on actual deceleration of the vehicle relative to a motor torque command, and
    wherein the feedback torque is based on a difference between a target motor RPM and an actual motor RPM.

14. The vehicle according to claim 13, wherein the slope load torque is calculated using longitudinal acceleration and deceleration, and
    wherein the disturbance torque is calculated using command torque, operation torque, and a motor speed.

15. The vehicle according to claim 12, wherein the base torque is determined based on a torque output map depending on a speed.

16. The vehicle according to claim 10, wherein the driving shaft fixing unit comprises a parking gear and a parking sprag.

17. The vehicle according to claim 10, wherein the motor torque calculation controller stops calculating the output torque when the specific condition is released.

18. A parking control method for a vehicle equipped with an electric motor, the method comprising:
    calculating output torque of the electric motor to stop the vehicle when a parking (P) range is selected in a situation in which a specific condition is satisfied;
    controlling the electric motor in response to the output torque; and
    activating a driving shaft fixing unit when the vehicle is stopped by the controlling,
    wherein the calculating is repeatedly performed until the vehicle is stopped.

* * * * *